(12) United States Patent
Johnsson et al.

(10) Patent No.: US 10,206,063 B2
(45) Date of Patent: *Feb. 12, 2019

(54) PROXIMITY DETECTION IN A DEVICE TO DEVICE NETWORK

(71) Applicant: Intel Corporation, Santa Clara, CA (US)

(72) Inventors: Kerstin Johnsson, Palo Alto, CA (US); Alexandre S. Stojanovski, Paris (FR); Muthaiah Venkatachalam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/861,510

(22) Filed: Jan. 3, 2018

(65) Prior Publication Data

US 2018/0146331 A1 May 24, 2018

Related U.S. Application Data

(63) Continuation of application No. 14/771,130, filed as application No. PCT/US2014/031836 on Mar. 26, 2014, now Pat. No. 9,883,338.

(Continued)

(51) Int. Cl.
*H04W 4/021* (2018.01)
*H04W 72/04* (2009.01)
(Continued)

(52) U.S. Cl.
CPC ............. *H04W 4/021* (2013.01); *H04L 67/16* (2013.01); *H04L 67/28* (2013.01); *H04W 4/00* (2013.01);
(Continued)

(58) Field of Classification Search
None
See application file for complete search history.

(56) References Cited

U.S. PATENT DOCUMENTS

2006/0160544 A1 7/2006 Sun et al.
2008/0075067 A1 3/2008 Guglielmi et al.
(Continued)

FOREIGN PATENT DOCUMENTS

CN 1527621 A 9/2004
CN 102972050 A 3/2013
(Continued)

OTHER PUBLICATIONS

SA, WG2 Meeting #95, S2-130319, Prague, Czech Republic—Jan. 28-Feb. 1, 2013, Motorola Mobility, Title Network Controlled ProSe Discovery, Agenda Item: 8.4, Work Item / Release: ProSe / Rel-12.*

(Continued)

*Primary Examiner* — Hassan A Phillips
*Assistant Examiner* — Gautam Sharma
(74) *Attorney, Agent, or Firm* — Thorpe North & Western

(57) ABSTRACT

A user equipment (UE) operable to communicate in a peer to peer (P2P) network is described. The UE can encode a proximity detection request for transmission to a ProSe server in an Evolved Packet Core (EPC). The proximity detection request can include one or more of: a time period window parameter, identification information of a second UE, or a proximity detection signal indicating when the proximity detection request is for proximity detection of the second UE. The UE can decode a proximity alert message received from the ProSe server in accordance with the time period window parameter.

21 Claims, 11 Drawing Sheets

Related U.S. Application Data

Figure 1:
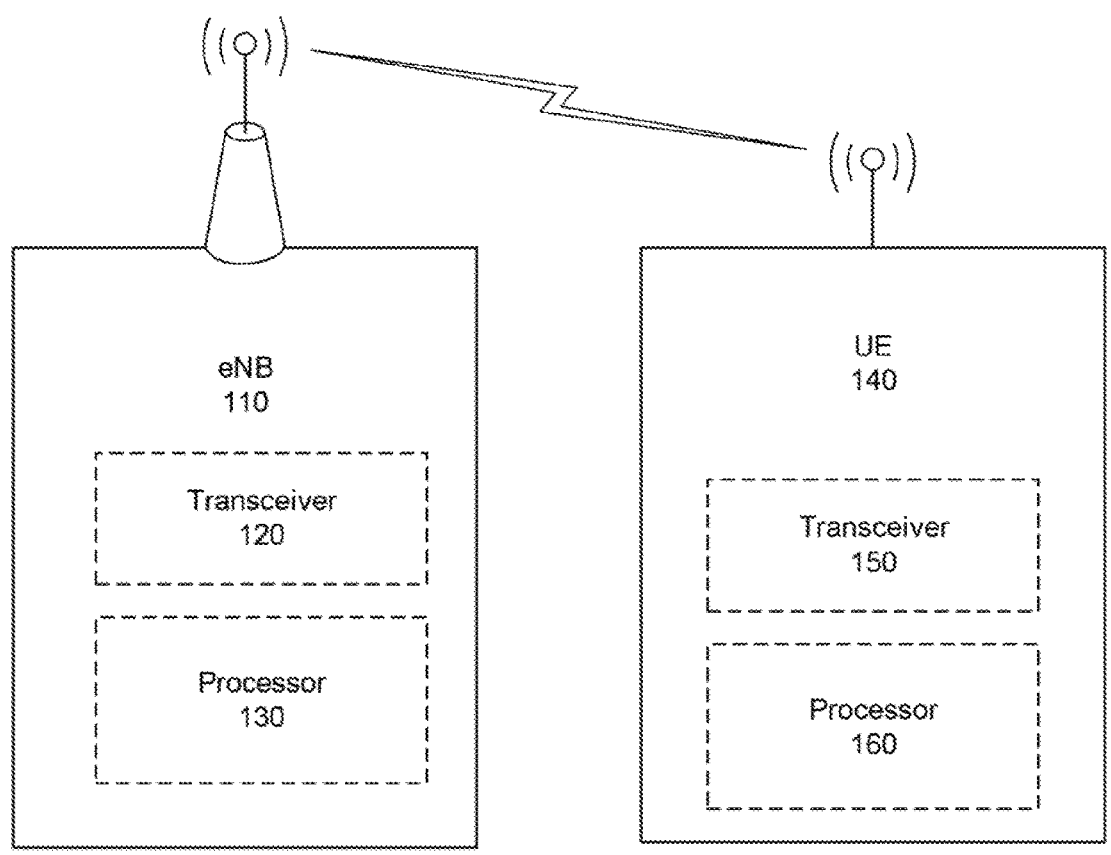
Figure 2:
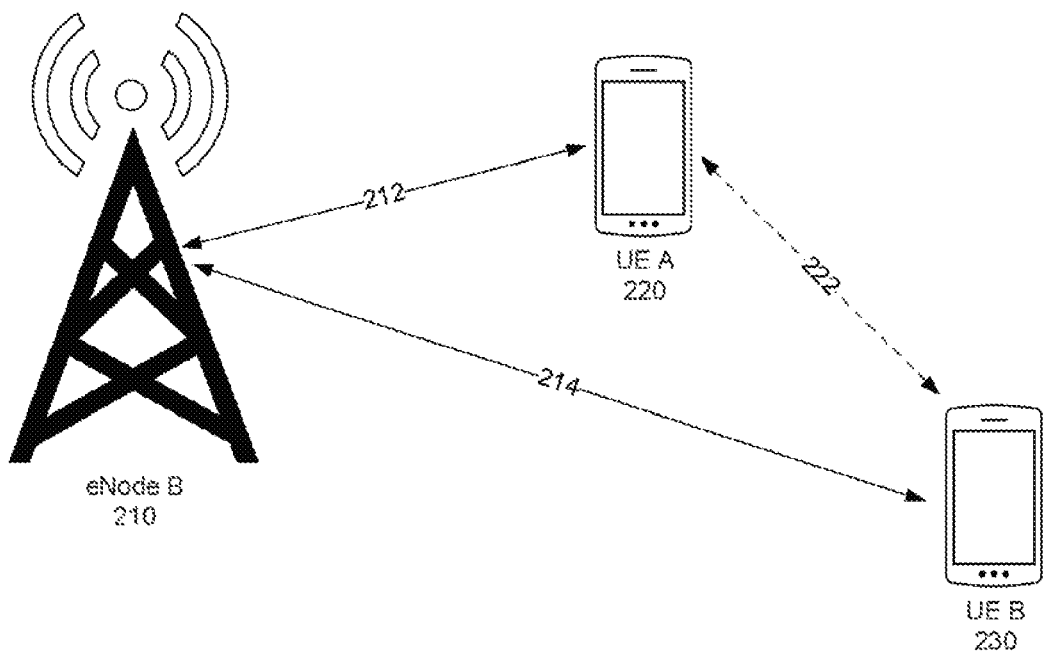

(60) Provisional application No. 61/809,157, filed on Apr. 5, 2013.

(51) Int. Cl.
*H04W 4/00* (2018.01)
*H04L 29/08* (2006.01)
*H04W 52/24* (2009.01)
*H04W 4/80* (2018.01)
*H04W 76/14* (2018.01)
*H04W 76/11* (2018.01)
*H04W 84/12* (2009.01)
*H04W 52/10* (2009.01)

(52) U.S. Cl.
CPC ............ *H04W 4/80* (2018.02); *H04W 52/244* (2013.01); *H04W 72/042* (2013.01); *H04W 72/0413* (2013.01); *H04W 72/0473* (2013.01); *H04W 76/11* (2018.02); *H04W 76/14* (2018.02); *H04W 52/10* (2013.01); *H04W 84/12* (2013.01)

(56) References Cited

U.S. PATENT DOCUMENTS

| | | | |
|---|---|---|---|
| 2010/0315954 A1 | 12/2010 | Singh et al. | |
| 2011/0134841 A1 | 6/2011 | Shaheen | |
| 2011/0258313 A1* | 10/2011 | Mallik | H04W 8/005 709/224 |
| 2012/0136984 A1 | 5/2012 | Wang et al. | |
| 2013/0064138 A1 | 3/2013 | Hakola et al. | |
| 2013/0159522 A1 | 6/2013 | Hakola et al. | |
| 2013/0336161 A1 | 12/2013 | Jung | |
| 2014/0078952 A1 | 3/2014 | Bontu et al. | |
| 2014/0198783 A1 | 7/2014 | Qi et al. | |
| 2014/0321452 A1 | 10/2014 | Choi et al. | |
| 2014/0342747 A1 | 11/2014 | Lee et al. | |

FOREIGN PATENT DOCUMENTS

| | | |
|---|---|---|
| JP | 2006-523404 A | 10/2006 |
| WO | WO 2011130623 A2 | 10/2011 |
| WO | WO 2011130630 A1 | 10/2011 |
| WO | WO 2012006446 A1 | 1/2012 |
| WO | WO 2013009992 A2 | 1/2013 |

OTHER PUBLICATIONS

3GPP TSG-SA WG1 Meeting #59—S1-122074: Clarification of requirements on application visibility of ProSe status; Agenda Item: 9.4FS_ProSe; Jul. 30 to Aug. 3, 2012; Chicago, USA.

SA WG2 Meeting #95—S2-130319: Network Controlled ProSe Discovery; Agenda Item: 8.4; Jan. 28 to Feb. 1, 2013; Prague, Czech Republic.

Intel et al.: EPC support of ProSe communication over WLAN, *Possible architecture and required functionality*; S2-130324; Jan. 28 to Feb. 1, 2012.

Intel et al; Prioritising EPC support of ProSe communication over WLAN; SA WG2 Meeting #95—S2-130323; Agenda Item: 8.4; Jan. 28 to Feb. 1, 2013; Prague, Czech Republic.

Intel et al., "EPC support of ProSe communication over WLAN, Possible architecture and required functionality"; 3GPP TSG SA WG2 S2-130324; (Jan. 22, 2013); 33 pages; Prague, Czech Republic.

Intel et al.; "Prioritising EPC support of ProSe communication over WLAN"; 3GPP SA WG2 Temporary Document Meeting #95 S2-130323; (Jan. 22, 2013); 3 pages; Agenda: 8.4, Release: ProSe/Rel-12; Prague, Czech Republic.

ZTE; "Clarification of requirements on application visibility of ProSe status"; 3GPP TSG-SA WG1 Meeting #59, S1-122074; (Jul. 20, 2012); 4 pages; Agenda: 9.4 FS_ProSe; Chicago, USA.

* cited by examiner

PROXIMITY DETECTION IN A DEVICE TO DEVICE NETWORK

RELATED APPLICATIONS

This application is a continuation of U.S. patent application Ser. No. 14/771,130, filed Aug. 27, 2015 , which is a 35.U.S.C. 371 nationalization of PCT/US2014/31836, filed Mar. 26, 2014 , which claims the benefit of U.S. Provisional Patent Application Ser. No. 61/809,157, filed Apr. 5, 2013, the entire specifications of which are hereby incorporated by reference in their entirety for all purposes.

BACKGROUND

Device to device (D2D) wireless communication techniques may be used to perform peer-to-peer or point-to-point (P2P) communications or machine type communications among mobile devices and networks in a variety of settings. D2D communications between mobile devices may be designed to complement the use of centralized communications from a wireless base station, for example, centralized station-to-mobile communications from an evolved Node B (eNode B) in a carrier network.

D2D direct communications are limited to devices, such as user equipment (UE), located within a communication range of a wireless protocol or network configuration. D2D direct communications are also limited when a selected device may not be aware of whether D2D communication-capable devices are within communication range or known devices associated with D2D communication-capable devices are within communication range. D2D direct communications are also limited when a selected device may not be aware of whether the D2D communication-capable devices and/or known devices associated with D2D communication-capable devices are currently or prospectively in proximity to the device. Existing discovery techniques used to locate and seek out nearby D2D-capable devices generally involve the use of broadcasting and response schemes, which utilize detailed processing, responses, and data exchanges to discover devices.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 1 depicts a multi-RAT HetNet with a macro-cell and a macro-node overlaided with layers of lower power nodes in accordance with an example;

FIG. 2 depicts a cooperative network in accordance with an example;

FIG. 3 illustrates a communications network for facilitating direct device to device (D2D) communications through a communications network in accordance with an example;

FIG. 4 shows a data sequence for establishing a network-assisted D2D communications connection between a user equipment (UE) and another UE when the other UE is in proximity to the UE in accordance with an example;

FIG. 5 shows a data sequence for detecting proximity between a UE and another UE based on a proximity detection request in accordance with an example;

FIG. 6 shows another data sequence for establishing a network-assisted D2D communications connection between a UE and another UE when a date window parameter occurs in accordance with an example;

FIG. 7 shows another data sequence for establishing a network-assisted D2D communications connection between a UE and another UE when a location window parameter occurs in accordance with an example;

FIG. 8 depicts the functionality of the computer circuitry of a UE operable to communicate in a D2D network in accordance with an example;

FIG. 9 depicts the functionality of the computer circuitry of an evolved packet core (EPC) that is operable to assist a UE to communicate in a D2D network in accordance with an example;

FIG. 10 illustrates a method for assisting UE to communicate in a D2D network in accordance with an example; and FIG. 11 illustrates a diagram of a UE in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

In device to device (D2D) communications, multiple mobile wireless devices, such as user equipment (UEs), can be configured to directly communicate with each other. In one embodiment, D2D connections between UEs can be established by one or more devices manually scanning to locate other nearby D2D-capable devices. In another embodiment, D2D connections between UEs can be established by broadcasting connection availability using a wireless network to locate nearby D2D-capable devices. Manually scanning for other UEs or broadcasting connection availability can involve the UE constantly scanning for other UEs and can cause a relatively high power usage at the UE. Additionally, even upon discovery of a nearby D2D-capable UE, identification and authentication issues can prevent establishment of a D2D connection between devices.

FIG. 1 show an eNode B 110 in a network assisted D2D communications system that includes a transceiver 120 and a computer processor 130. FIG. 1 also illustrates a UE 140 in the network assisted D2D communications system that includes a transceiver 150 and a computer processor 160. D2D communication systems can provide mobile device users with better quality of service (QoS), new applications, and increased mobility support. To establish D2D communications, the UEs within a D2D communications system can be configured to communicate with other D2D enabled UEs that are participating in the D2D system.

FIG. 2 illustrates UE A 220 and UE B 230 each in communication with an eNode B 210 of a communications network using communications links 212 and 214. FIG. 2 also illustrates that UE A 220 and UE B 230 are in direct communication with each other using a D2D communications link 222. The UEs in the D2D communication system can share resources of a communications network, where the UEs are configured to share resources with devices that are communicating with the eNode B in the communications network. In one embodiment, the communications network can be a cellular network, such as a third generation partnership project (3GPP) long term evolution (LTE) Rel. 8, 9, 10, 11, or 12 network and/or an Institute of Electrical and Electronics Engineers (IEEE) 802.16p, 802.16n, 802.16m-2011, 802.16h-2010, 802.16j-2009, 802.16-2009 network.

The device discovery process can include a device discovery message transmitted from the communications network. The device discovery message can indicate to at least a pair of the UEs a device discovery period. The device discovery period can be a discovery period for UEs to discover each other and communicate with each other via the D2D protocols. One advantage of using a network assisted device discovery process can be to improve the speed and power efficiency of the D2D device discovery procedure for each UE in a D2D network.

In one embodiment, the network assisted D2D discovery can be used to perform network level device proximity detection. To perform proximity detection, a core network device, such as a proximity services (ProSe) server, can use UE locations as inputs and determine a potential for successful D2D communications for the UE. In one embodiment, for network level D2D discovery, a communications network can monitor UE locations and calculate a proximity of one or more UEs to other UEs. In one embodiment, location services (LCS) of the network can be used to estimate a UE location.

In one embodiment, a ProSe server can be a network entity, a network element, or a core network device that can assist UEs with proximity detection. For example, the ProSe server can obtain UE location estimates via the LCS of a network. Traditionally, LCS functionalities can expend a lot of signaling on a core network and radio and/or battery resources at the UE to perform proximity detection.

In one embodiment, the network can assist in locating or discovering various D2D-capable devices within a network and enable D2D authentication between the D2D-capable devices. Upon discovery and D2D authentication of proximate or adjacent D2D-capable devices, a D2D communications link between the adjacent D2D devices can be established to facilitate the exchange of data over the D2D communications link. In one embodiment, the D2D communications link can be deployed in connection with selected date-based services or location-based services. In one embodiment, the D2D communications link can be established over an unlicensed band in a wireless network, such as a wireless local area network (WLAN). In one embodiment, the WLAN can operate based on a standard such as the Institute of Electronics and Electrical Engineers (IEEE) 802.11-2012, IEEE 802.11ac, or IEEE 802.11ad standards. In another embodiment, the D2D communications link can be established over unlicensed portions of the radio spectrum, such as Bluetooth v1.0, Bluetooth v2.0, Bluetooth v3.0, Bluetooth v4.0, IEEE 802.15.4-2003 (Zigbee 2003), IEEE 802.15.4-2006 (Zigbee 2006), IEEE 802.15.4-2007 (Zigbee Pro). In another embodiment, the D2D communications link can be established over licensed bands in a cellular network. In one embodiment, the cellular network may be 3GPP LTE Rel. 8, 9, 10, 11, or 12 networks and/or IEEE 802.16p, 802.16n, 802.16m-2011, 802.16h-2010, 802.16j-2009, 802.16-2009.

In one embodiment, network-assisted D2D discovery can use an eNode B or an evolved packet core (EPC) of an eNode B to discover and/or identify other D2D enabled UEs and aid in the connection of the D2D UEs for D2D communication of data. In one embodiment, a communications network, such as a cellular third generation partnership project (3GPP) network, can assist the UEs in setting up D2D communications links with other UEs configured for D2D communications.

For example, a UE in communication with a cellular communications network, such as a cellular radio access network (RAN), can request UE discovery assistance from an EPC of the communications network. Information obtained from the UE discovery assistance can include information to assist the D2D connection discovery process and/or identification information for other UEs. The EPC can also communicate authentication information, security information, identification information, and establish a time period to coordinate D2D discovery and connection operations. In one embodiment, in a cellular network environment, the EPC can maintain LCS to monitor an approximate location of the various UEs in the communications network. The location information of the UEs with respect to other UEs in the communications network can assist the UEs in discovering other D2D-capable devices and/or establishing D2D connections for direct communications.

Figure 3:
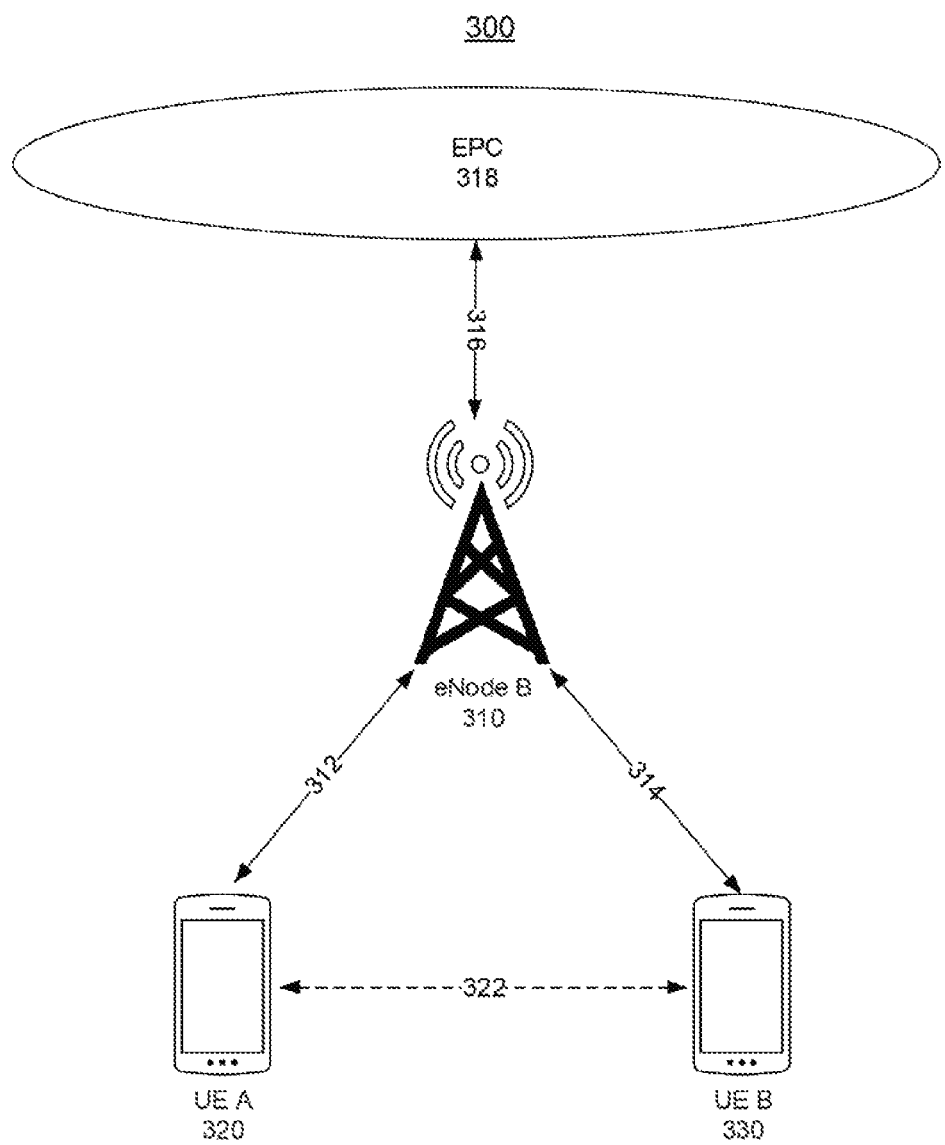

FIG. 3 illustrates a communications network 300 for facilitating direct D2D communications through the communications network 300. Within the communications network 300, a plurality of UEs, such as UE A 320 and UE B 330 are in communication with the EPC 318 through communications link 316 via communications links 312 and 314 with the eNode B 310, respectively. FIG. 3 further illustrates that within the communications network 300, a plurality of UEs, such as UE A 320 and UE B 330 can be in D2D communications with each other using a D2D communications link 322. In one embodiment, the communications network 300 can be a cellular network or other type of wireless network. In one embodiment, a wireless network can enable a UE to communicate data or information via the eNode B 310 to the EPC 318 of the communications network 300. In another embodiment, the cellular network can provide for the communication of data between the UE A 320 and the UE B 330 using a cellular communications links 312 and 314, respectively.

D2D communications between the UE A 320 and the UE B 330 can be performed using D2D communications link 322. In one embodiment, the D2D communications link 322 can be configured for direct point-to-point connections between devices. In another embodiment, the D2D communications link 322 can be configured indirect peer-to-peer connections between devices or multi-node connections between devices.

The D2D communications link 322 can be established with the assistance of the EPC 318 of the communications network 300. The EPC 318 can assist the UE A 320, in discovering a D2D UE B 330 and setting up a D2D communications link 322 between UE A 320 and D2D UE B 330.

In one embodiment, a proximity detection request received from a UE can be used to indicate a request to an EPC to perform proximity detection of other selected UEs based on a date window parameter and/or a location window parameter. In one embodiment, the date window parameter can indicate a specific date that a UE requests for proximity detection from the network or the EPC. For example, the date window parameter can indicate one or more specific times of the day, days of the week, weeks of the month, months of the year, or other specific times for proximity detection.

In another embodiment, the UE can designate a permanent detection window for specific locations. For example, the location window parameter can indicate a specific location that a UE requests that the EPC perform proximity detection. For example, the location window parameter can indicate a specific enterprise location or commercial environment for proximity detection. In one embodiment, a window parameter can be a combination of the date window parameter and a location window parameter. For example, the combination of the date window parameter and the location window parameter can indicate a specific time of the day and a specific location to perform proximity detection.

Typically, a device, such as a UE, is configured to continuously search for other D2D devices on radio bands when the device is configured to engage in D2D communications. One advantage of targeted network-assisted device discovery, such as for a selected date window parameter and/or a location window parameter, can be to alleviate signal interference that can be caused by the continuous searching for other D2D devices on the radio bands. Another advantage of targeted network-assisted device discovery can be to increase the efficiency of the communications network by performing targeted proximity detection at selected dates or location and/or for selected UEs. Another advantage of targeted network-assisted device discovery can be to decrease power consumption by decreasing the time a UE, eNode B, or EPC searches for other D2D devices.

Figure 4:
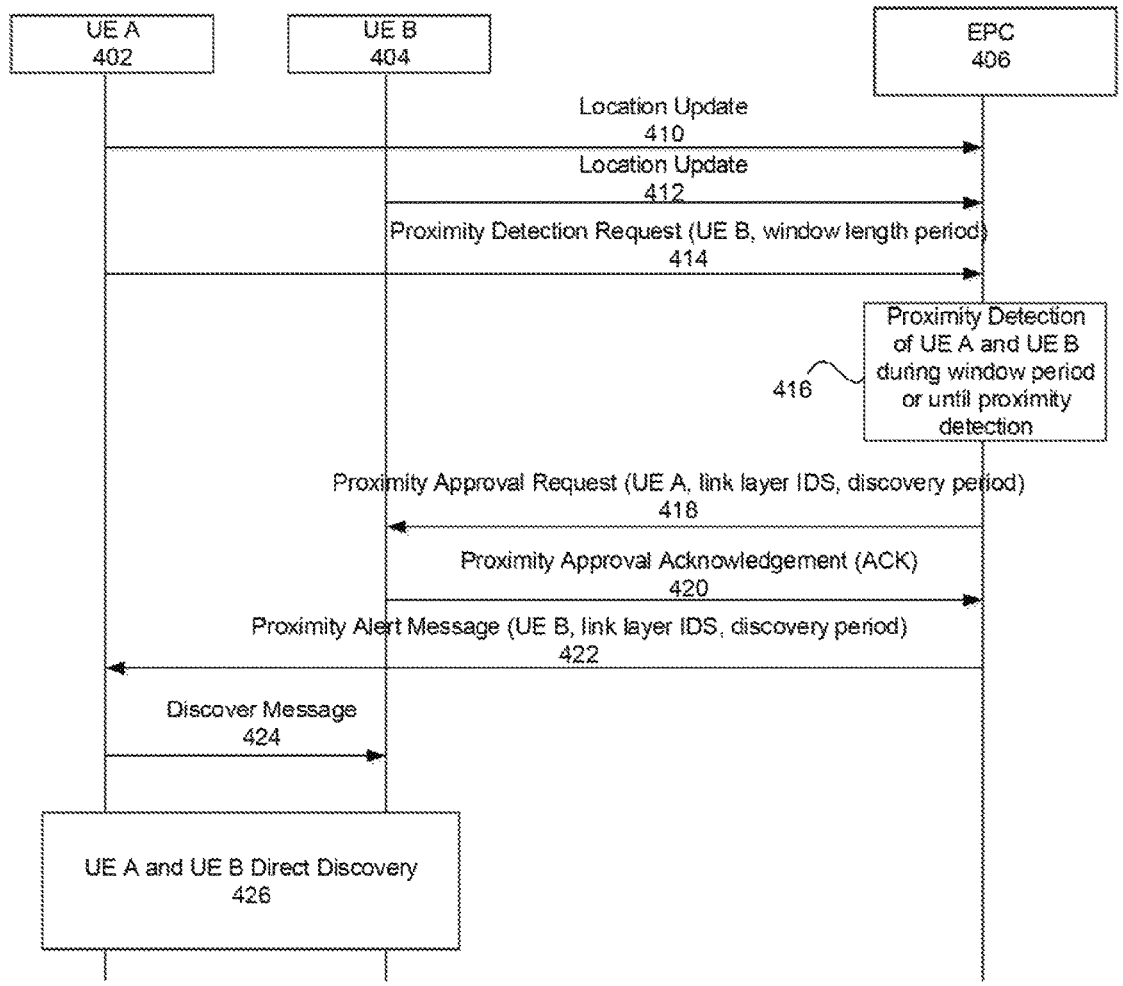

FIG. 4 shows a data sequence 400 for establishing a network-assisted D2D communications connection between UE A 402 and another UE, such as UE B 404, when the other UE is in proximity to UE A. In FIG. 4, UE A 402 can send intermittent location updates 410 to the EPC 406 and UE B 404 can send intermittent location updates 412 to the EPC 406. The location updates can enable the EPC 406 to be informed of the current locations of UE A 402 and UE B 404, respectively. In one example, information communicated in the location updates can include a position associated with a network coverage area, a position associated with a broader geographic area of the UE, or a specific determined geographical position. In another example, the location updates include information related to a portion of the communication network, such as a node or cell, which the UE is in communication with.

The EPC 406 can receive a proximity detection request 414 from UE A 402 requesting to set up D2D communication with one or more other UEs, such as UE B 404. The proximity detection request 414 can include a window length period for defining a length of time during which the UE A 402 requests proximity detection. In one embodiment, the proximity detection request 414 can include a window parameter that is a single event request. For example, UE A 402 can request that the EPC 406 make a single attempt to set up D2D communication between UE A 402 and UE B 404 within a length of time.

In another embodiment, the proximity detection request 414 can include a window parameter that is a time period request. For example, UE A 402 can make a request to EPC 406 to continuously, semi-continuously, or periodically attempt to set up D2D communications between UE A 402 and UE B 404 for a selected length of time.

In one embodiment, when the selected length of time specified in the proximity detection request 414 lapses, the EPC 406 can stop monitoring the proximity of UE B 404 relative to UE A 402. In one embodiment, the proximity detection request 414 can be issued for multiple UEs. In one embodiment, the proximity detection request 414 can indicate a request by UE A 402 for the EPC 406 to indicate when a specific UE (such as UE B 404), a type of UE, or a group of UEs is in proximity to UE A 402. In another embodiment, the proximity detection request 414 can indicate a request by UE A 402 to receive assistance from the communications network in the D2D UE discovery process.

The EPC 406 can determine at step 416 when the UE A 402 is in proximity of other UEs listed in the proximity detection request 414. In one example, the EPC 406 can use information received in one or more UE location updates 410 or 412 to determine proximity. In another example, the EPC can determine the proximity of UE A 402 relative to UE B 404 when UE A 402 and UE B 404 are associated with the same eNode B, are in communication with selected eNode Bs, or are in communication with selected network elements or subsystems.

When proximity is determined, EPC 406 can communicate a proximity approval request 418 to UE B 404, requesting to establish a D2D connection between UE A 402 and UE B 404. When UE B 404 accepts proximity approval request 418, the UE B 404 can communicate a proximity approval acknowledgement (ACK) 420.

When the EPC receives the proximity approval ACK 420, the EPC 406 can transmit a proximity alert message 422 to UE A 402. The proximity alert message 422 can include identifying information of UE B 404 to enable UE A 402 to find and connect with UE B 404. In one embodiment, the D2D update response can include information related to a common discovery period to coordinate discovery timing.

In one embodiment, the EPC 406 can provide a timing or discovery period in the proximity alert message 422 to establish the D2D communications link. UE A 402 can use the proximity alert message 422 from the EPC 406 to transmit a discovery message 424 to the other UEs, such as UE B 404, to establish a D2D communications link 426 using the assistance information for the other UEs. During the timing or discovery period, UE A and UE B can attempt to discover each other and establish a D2D communications link using the identification information. The identification information can be provided by the EPC 406 to UE B in the D2D Connection Request and to UE A in the D2D Update Response 420.

Figure 5:
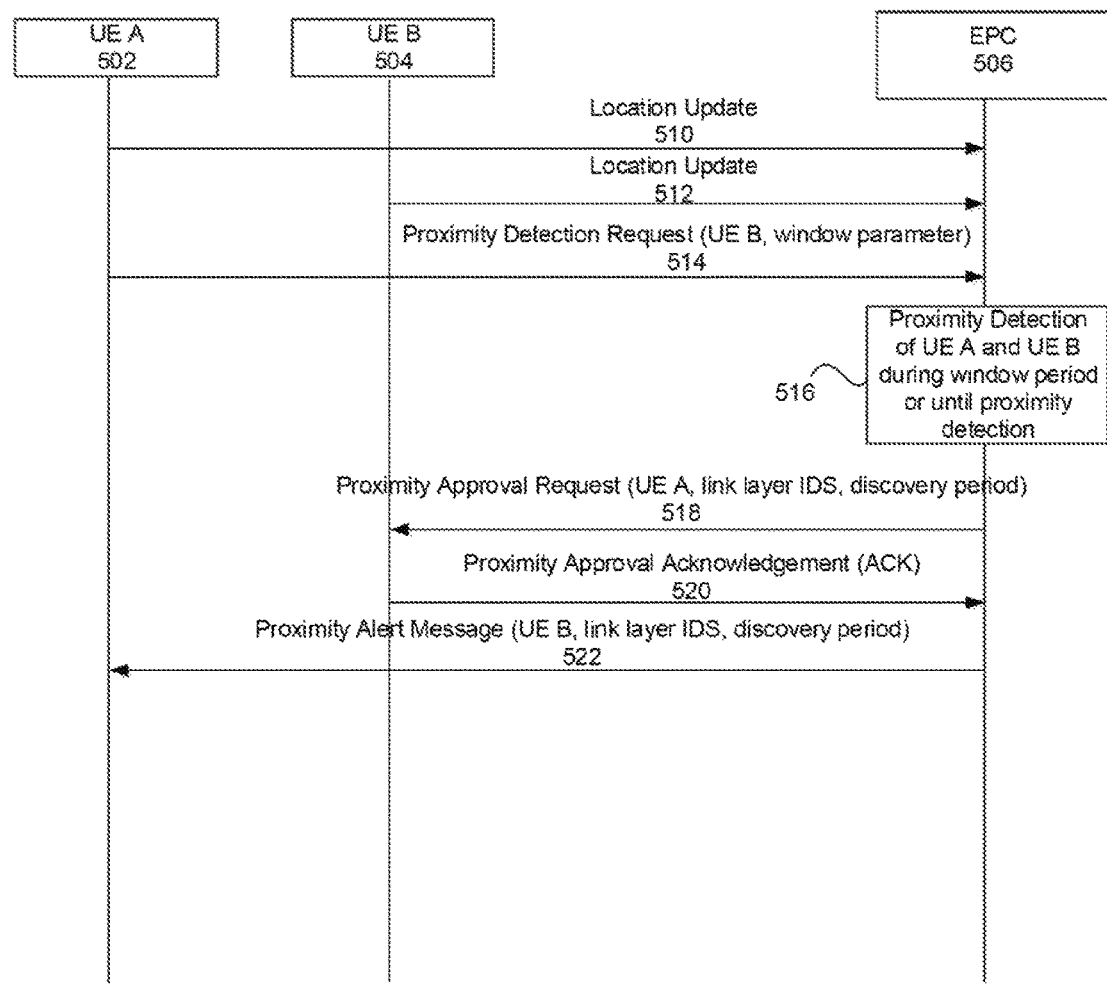

FIG. 5 shows a data sequence 500 for detecting proximity between UE A 502 and another UE, such as UE B 504, based on a proximity detection request. The EPC 506 can receive a proximity detection request 514 from UE A 502 requesting to set up D2D communications between UE A 502 and one or more other UEs, such as UE B 504. In one embodiment, the proximity detection request 514 can include a date window parameter or a location window parameter. In one embodiment, the date window parameter can include date window information such as a time of the day or a day of a week for establishing D2D communications in a communications network. In another embodiment, the date window parameter can include date range window information such as a week of a month or a month of a year for establishing D2D communications in a communications network.

In one embodiment, the proximity detection request 514 can include a window parameter that is a single event request. For example, UE A 502 can request that the EPC 506 make a single attempt to set up a D2D communications link between UE A 502 and UE B 504 when a selected date is reached. In another embodiment, the proximity detection request 514 can include a window parameter that is a date request. For example, UE A 502 can make a request to EPC 506 to continuously, semi-continuously, or periodically attempt to set up aD2D communications link between UE A 502 and UE B 504 beginning at a selected date or date range, such as beginning at a time of day on a selected day each week.

In one embodiment, when the selected date or date range lapses, the EPC 506 may stop monitoring the proximity of UE B 504 relative to UE A 502. In one embodiment, the proximity detection request 514 can be issued for multiple UEs. In one embodiment, the proximity detection request 514 can indicate a request by UE A 502 to the EPC 506 to indicate when a specific UE (such as UE B 504), a type of UE, or a group of UEs is within a selected proximity range of UE A 502 on a selected date or within a selected date range. The EPC 506 can determine at step 516 when the UE A 502 is in proximity to one or more other UEs listed in the proximity detection request 514.

In another embodiment, the proximity detection request 514 can include a location window parameter. In one embodiment, the location window parameter can include location window information such as a selected geographic setting for establishing D2D communications in a D2D network.

In one embodiment, the selected geographic setting can include: a selected location type; current location information of a first UE; current location information of a second UE; a selected commercial environment setting; a radius setting for a selected radius adjacent the first UE; a radius setting for a selected radius adjacent the second UE; a selected state of a country setting; a selected city of a state setting; a selected region or area setting; a selected landmark setting; a selected landmark type setting; a type of neighborhood setting; a selected location of a structure setting; a location boundary setting; point of reference setting; or a radius setting for a radius surrounding a point of reference.

The EPC 506 can determine at step 516 when the UE A 502 is in proximity of other UEs listed in the proximity detection request 514. In one example, the EPC 506 can use information received in one or more UE location updates 510 or 512 to determine proximity. In another example, the EPC can determine the proximity of UE A 502 relative to UE B 504 when UE A 502 and UE B 504 are associated with the same eNode B, are in communication with selected eNode Bs, or are in communication with selected network subsystems.

When proximity is determined, EPC 506 can communicate a proximity approval request 518 to UE B 504, requesting to establish a D2D connection between UE A 502 and UE B 504. When UE B 504 accepts proximity approval request 518, the UE B 504 can communicate a proximity approval acknowledgement (ACK) 520.

In one embodiment, when the EPC receives the proximity approval ACK 520, the EPC 506 can transmit a proximity alert message 522 to UE A 502. In one embodiment, the proximity alert message 522 can include identifying information of UE B 504 to enable UE A 502 to find and connect with UE B 504. In another embodiment, the D2D update response can include information related to a common discovery period to coordinate discovery timing. In one embodiment, the EPC 506 can provide a timing or discovery period in the proximity alert message 522 to establish the D2D communications link.

In another embodiment, when the EPC receives the proximity approval ACK 520, the EPC 506 can transmit a proximity alert message 522 to UE A 502. In one embodiment, the proximity alert message 522 can include identifying information of UE B 504 to indicate to UE A 502 when UE B 504 is within a selected proximity threshold at a selected location based on the location window parameter and/or at a selected date based on the date window parameter.

Figure 6:
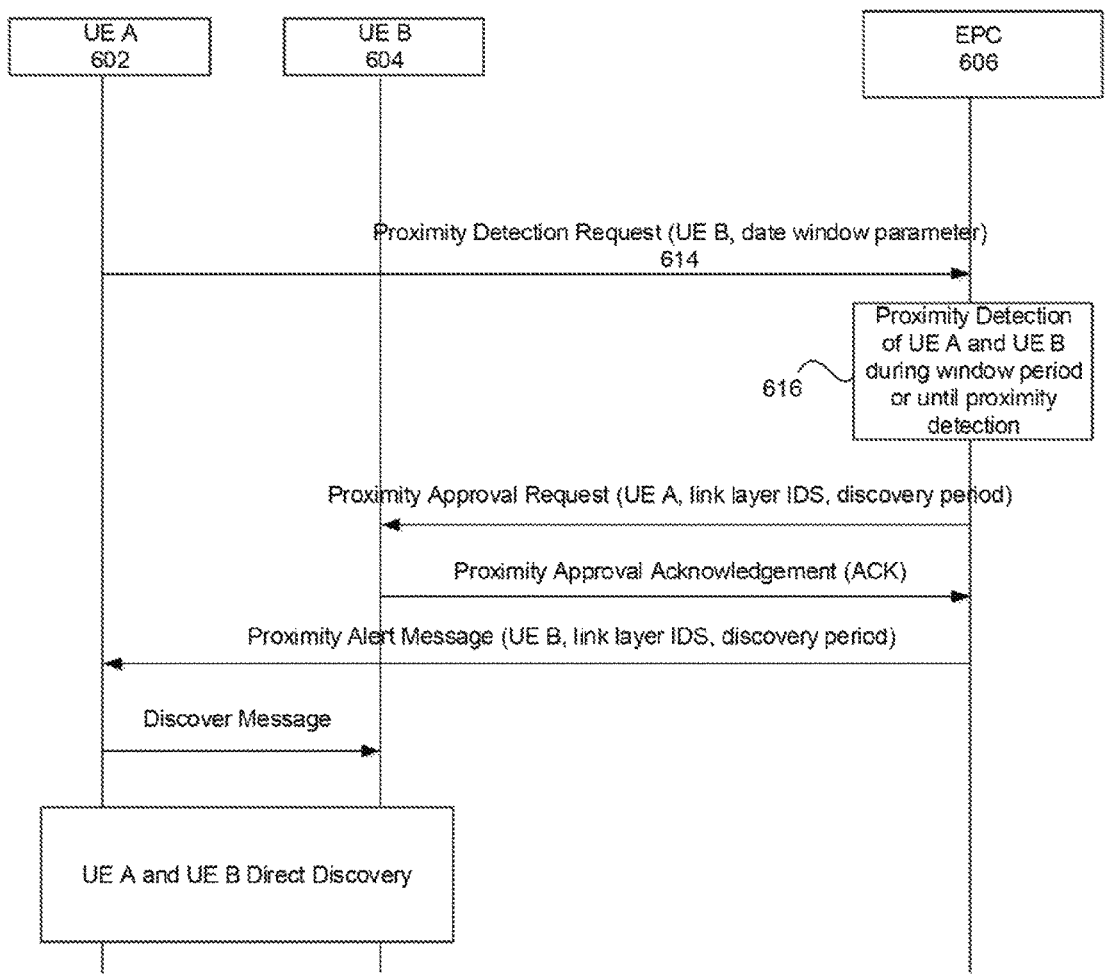

FIG. 6 shows a data sequence 600 for establishing a network-assisted D2D communications connection between UE A 602 and another UE, such as UE B 604, when a date window parameter occurs. The EPC 606 can receive a proximity detection request 614 from UE A 602 requesting to set up D2D communications between UE A 602 and one or more other UEs, such as UE B 604. In one embodiment, the proximity detection request 614 can include a date window parameter. In one embodiment, the date window parameter can include date window information such as a time of the day or a day of a week for establishing D2D communications in a communications network. In another embodiment, the date window parameter can include date range window information such as a week of a month or a month of a year for establishing D2D communications in a communications network.

In one embodiment, the proximity detection request 614 can include a window parameter that is a single event request. For example, UE A 602 can request that the EPC 606 make a single attempt to set up a D2D communications link between UE A 602 and UE B 604 when a selected date is reached. In another embodiment, the proximity detection request 614 can include a window parameter that is a date request. For example, UE A 602 can make a request to EPC 606 to continuously, semi-continuously, or periodically attempt to set up aD2D communications link between UE A 602 and UE B 604 beginning at a selected date or date range, such as beginning at a time of day on a selected day each week.

In one embodiment, when the selected date or date range lapses, the EPC 606 may stop monitoring the proximity of UE B 604 relative to UE A 602. In one embodiment, the proximity detection request 614 can be issued for multiple UEs. In one embodiment, the proximity detection request 614 can indicate a request by UE A 602 to the EPC 606 to indicate when a specific UE (such as UE B 604), a type of UE, or a group of UEs is within a selected proximity range of UE A 602 on a selected date or within a selected date range. The EPC 606 can determine at step 616 when the UE A 602 is in proximity to one or more other UEs listed in the proximity detection request 614. The remainder of FIG. 6 is substantially similar to FIG. 4.

Figure 7:
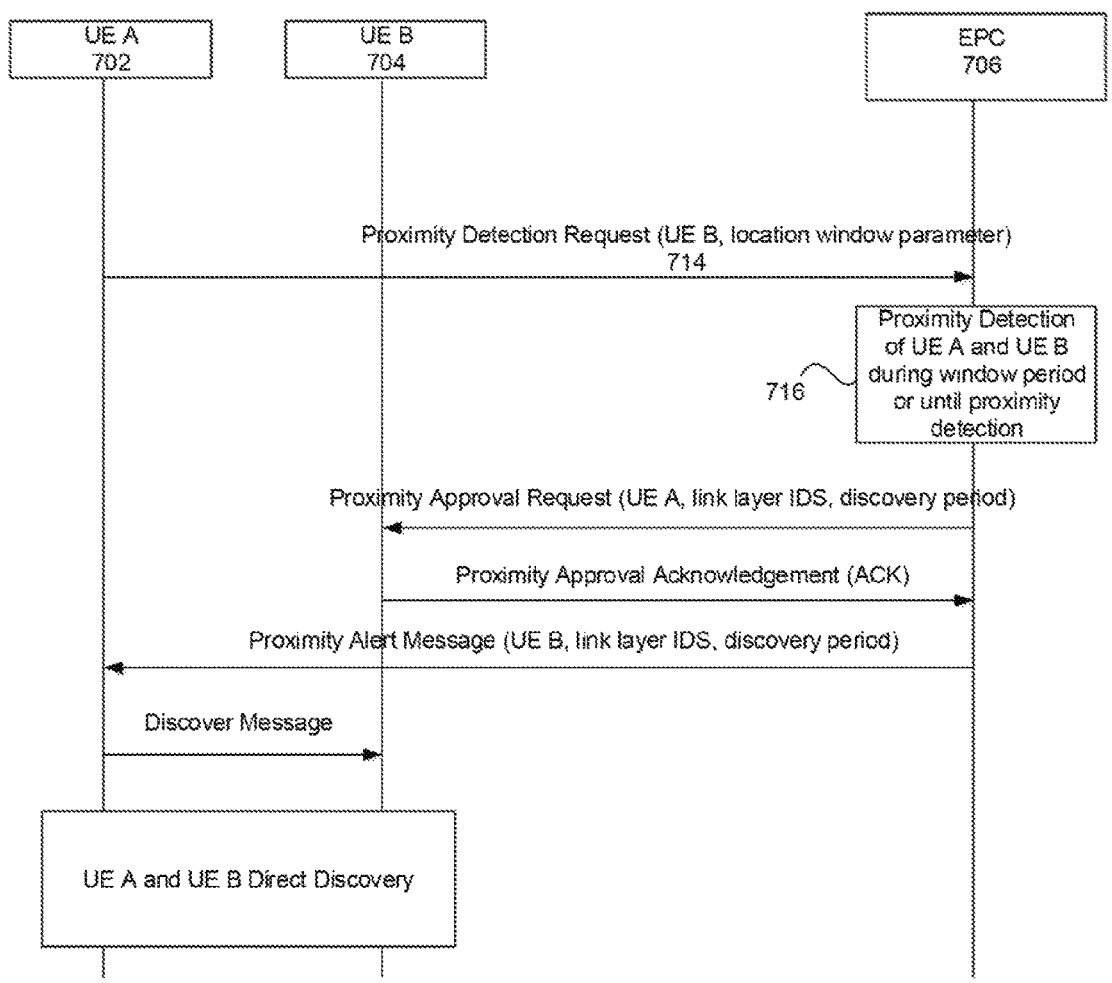

FIG. 7 shows a data sequence 700 for establishing a network-assisted D2D communications connection between UE A 702 and another UE, such as UE B 704, when a location window parameter occurs. The EPC 706 can receive a proximity detection request 714 from UE A 702 requesting to set up D2D communications with other UE(s), such as UE B 704. In one embodiment, the proximity detection request 714 can include a location window parameter. In one embodiment, the location window parameter can include location window information such as a selected geographic setting for establishing D2D communications in a D2D network.

In one embodiment, the selected geographic setting can include: a selected location type; current location information of a first UE; current location information of a second UE; a selected commercial environment setting; a radius setting for a selected radius adjacent the first UE; a radius setting for a selected radius adjacent the second UE; a selected state of a country setting; a selected city of a state setting; a selected region or area setting; a selected landmark setting; a selected landmark type setting; a type of neighborhood setting; a selected location of a structure setting; a location boundary setting; point of reference setting; or a radius setting for a radius surrounding a point of reference.

In one embodiment, the proximity detection request 714 can include a window parameter that is a single event request. For example, UE A 702 can request that the EPC 706 make a single attempt to set up D2D communicates between UE A 702 and UE B 704 when a selected geographic setting is reached by UE A 702. In another embodiment, the proximity detection request 714 can include a window parameter that is a location request. For example, UE A 702 can make a request to EPC 706 to continuously, semi-continuously, or periodically attempt to set up a D2D communications link between UE A 702 and UE B 704 when a selected geographic setting is reached.

In one embodiment, when the selected geographic setting is reached, the EPC 706 may stop monitoring the proximity of UE B 704 relative to UE A 702. In one embodiment, the proximity detection request 714 can be issued for multiple UEs. In one embodiment, the proximity detection request 714 can indicate a request by UE A 702 to the EPC 706 to indicate when a specific UE (such as UE B 704), a type of UE, or a group of UEs is within a selected proximity range of the UE A 702 at a selected geographic setting. The EPC 706 can determine at step 716 when UE A 702 is in proximity to one or more other UEs listed in the proximity detection request 714. The remainder of FIG. 7 is substantially similar to FIGS. 4 and 6.

One advantage of using the location window parameter to determine when to perform proximity detection is that setting up a D2D communications link is more efficient when a UE is able to request network-assisted device discovery for certain UEs whenever it is in a given location. For example, the UE can specify GPS coordinates and a radius of interest for performing proximity detection. In another example, the UE can specify a current location of the UE and a radius of interest for performing proximity detection. In one embodiment, the communications network can perform location estimation on the UE at the current location of the UE to determine the current location of the UE before storing the current location information for a proximity detection procedure. In one embodiment, the UE can send the EPC a detection window request based on both a time parameter and a location parameter.

Figure 8:
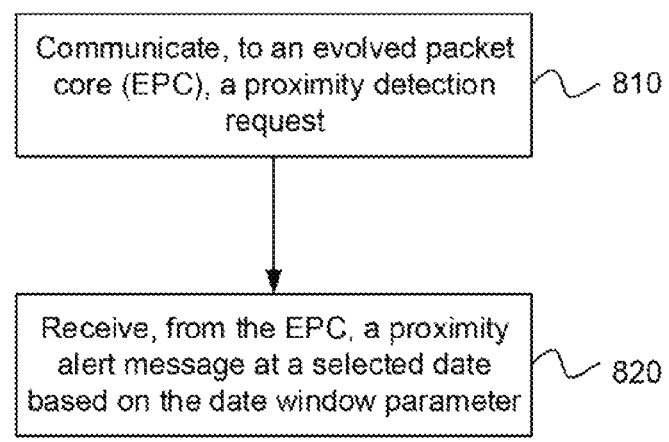

FIG. 8 uses a flow chart 800 to illustrate the functionality of one embodiment of the computer circuitry with a UE operable to communicate in a D2D network. The functionality may be implemented as a method or the functionality may be executed as instructions on a machine, where the instructions are included on at least one computer readable medium or one non-transitory machine readable storage medium. The computer circuitry can be configured to communicate, to an evolved packet core (EPC), a proximity detection request, as in block 810. In one embodiment, the proximity detection request includes a date window parameter, an identification information of a second UE, and/or a proximity detection signal indicating whether the proximity detection request is for proximity detection of the second UE or for establishing a D2D connection with the second UE. The computer circuitry can be further configured to receive, from the EPC, a proximity alert message at a selected date based on the date window parameter, as in block 820.

In one embodiment, the proximity alert message can include assistance information for D2D communication of the UE with the second UE. In another embodiment, the computer circuitry can be further configured to transmit, to the second UE, a discovery message to establish a D2D connection using the assistance information for the second UE. In another embodiment, the date window parameter includes a time of day, a day of a week, a week of a month, or a month of a year for establishing communications with the second UE in the D2D network. In another embodiment, the proximity detection request includes a location window parameter. In another embodiment, the location window parameter is a selected geographic setting.

In one embodiment, the selected geographic setting includes a selected location type, a current location information of the first UE, a current location information of the second UE, a selected commercial environment setting, a radius setting for a selected radius adjacent the first UE, a radius setting for a selected radius adjacent the second UE, a selected state setting, a selected city setting, a selected region setting, a selected landmark setting, a selected landmark type setting, a type of neighborhood setting, a selected location of a structure setting, a location boundary setting, point of reference setting, or a radius setting for a radius surrounding a point of reference.

In another embodiment, the proximity detection request includes identification information for a plurality of UEs, one or more selected types of UEs, one or more selected groups of UEs, or one or more selected categories of UEs. In another embodiment, the date window parameter includes a plurality of times of day, days of a week, weeks of a month, or months of a year for proximity detection of other UEs in the D2D network or for establishing D2D communications between the UE and other UEs in the D2D network. In another embodiment, the computer circuitry can be further configured to directly communicate with the second UE using a D2D communications connection. In another embodiment, the D2D communications connection is a wireless local area network (WLAN) connection, a wireless fidelity (WiFi) direct connection, a Bluetooth connection, or a Zigbee connection.

Figure 9:
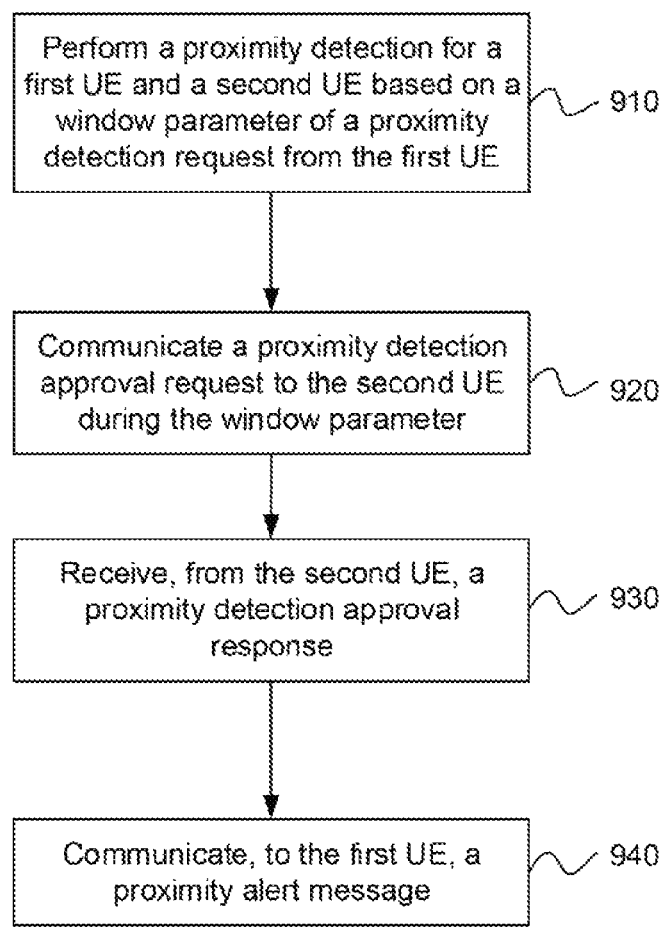

FIG. 9 provides a flow chart 900 to illustrate the functionality of one embodiment of the computer circuitry with an EPC operable to assist a UE to communicate in a D2D network. The functionality may be implemented as a method or the functionality may be executed as instructions on a machine, where the instructions are included on at least one computer readable medium or one non-transitory machine readable storage medium. The computer circuitry can be configured to perform a proximity detection for a first UE and a second UE based on a window parameter of a proximity detection request from the first UE, as in block 910. The computer circuitry can be further configured to communicate a proximity detection approval request to the second UE during the window parameter, wherein the proximity detection approval request includes identification information for the first UE, as in block 920. The computer circuitry can also be configured to receive, from the second UE, a proximity detection approval response, as in block 930. The computer circuitry can also be configured to communicate, to the first UE, a proximity alert message, as in block 940.

In one embodiment, the proximity detection approval request includes timing information for performing discovery of the first UE. In another embodiment, the proximity alert message includes connection information for the second UE and timing information for performing discovery of the second UE. In another embodiment, the computer circuitry can be further configured to receive, from the first UE, the proximity detection request, wherein the proximity detection request includes a window parameter, identification information related to the second UE, and a proximity detection signal indicating whether the proximity detection request is for proximity detection of the second UE or for establishing a D2D connection between the first UE and the second UE.

In one embodiment, the computer circuitry can be further configured to store a predetermined proximity detection request, wherein the predetermined proximity detection request includes a window parameter and identification information related to the second UE. In another embodiment, the window parameter includes a date window parameter or a location window parameter. In another embodiment, the computer circuitry can be further configured to receive location information for the first UE to determine when the first UE is within the location window parameter to perform the proximity detection.

In another embodiment, the computer circuitry can be further configured to determine a location of the first UE or the second UE using a global position system (GPS), signal triangulation, a beacon signal, cell coverage based positioning, observed time difference of arrival (OTDOA) positioning, enhanced observed time difference (E-OTD) positioning, assisted-global navigation satellite system (A-GNSS) positioning, uplink time difference of arrival (UTDOA) positioning, or enhanced observed time difference (E-OTD) positioning. In another embodiment, the computer circuitry is further configured to provide the first UE with window parameter selection options. In another embodiment, the computer circuitry can be further configured to monitoring, in substantially real-time, when the second UE is within a selected radius of the first UE.

Figure 10:
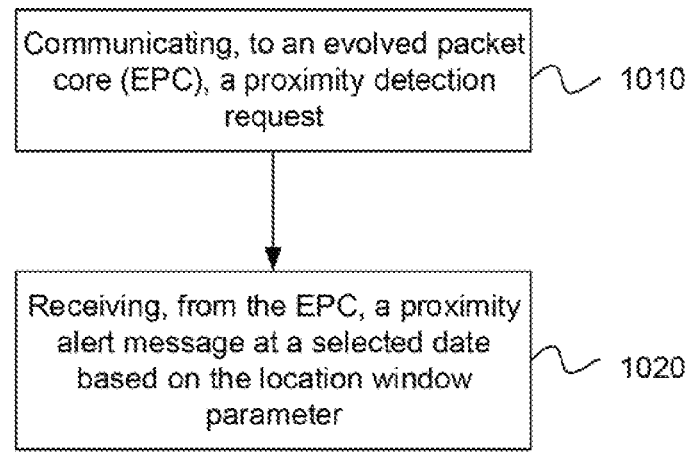

FIG. 10 uses a flow chart 1000 to illustrate the functionality of one embodiment of a method for assisting a UE to communicate in a D2D network. The method can comprise communicating, to an EPC, a proximity detection request, as in block 1010. In one embodiment, the proximity detection request can include a location window parameter, an identification information of a second UE, and/or a detection signal indicating whether the proximity detection request is for proximity detection of the second UE or for establishing a D2D connection with the second UE. The method can further comprise receiving, from the EPC, a proximity alert message at a selected date based on the location window parameter, as in block 1020.

In one embodiment, the method can further comprise transmitting, to the second UE, a discovery message to establish a D2D connection using the assistance information for the second UE. In another embodiment, the proximity detection request includes a date window parameter. In another embodiment, the location window parameter or the date window parameter is a recurring event. In another embodiment, the method can further comprise communicating, to the EPC, a proximity detection cancellation request, wherein the proximity detection cancellation request stops the EPC from determining when a proximity event occurs based on the proximity detection request when the UE is located within the location window parameter or the date window parameter. In another embodiment, the method can further comprise receiving, at the first UE, proximity detection request information from user input information.

Figure 11:
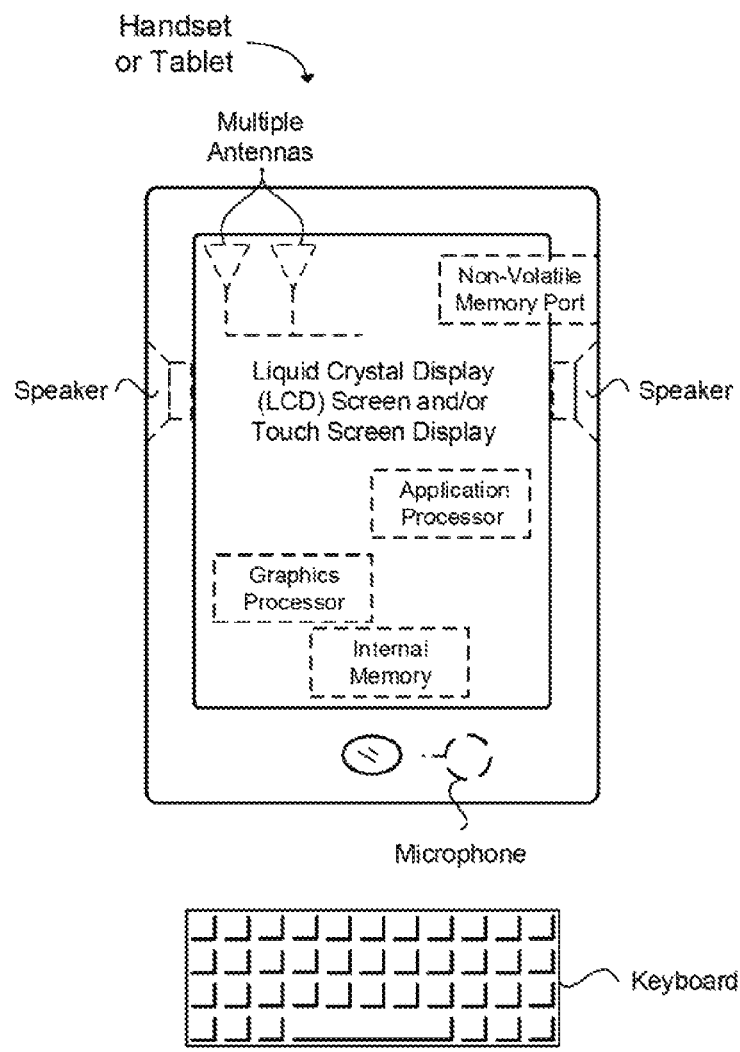

FIG. 11 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and Wi-Fi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 11 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile station may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. An apparatus of a user equipment (UE) operable to communicate in a peer to peer (P2P) network, the apparatus comprising one or more processors configured to:
    encode, at the UE, a proximity detection request for transmission to a ProSe server in an Evolved Packet Core (EPC), wherein the proximity detection request includes:
        a time period window parameter;
        identification information of a second UE, and
        a proximity detection signal indicating when the proximity detection request is for proximity detection of the second UE; and
    decode, at the UE, a proximity alert message received from the ProSe server in accordance with the time period window parameter.

2. The apparatus of claim 1, further comprising a transceiver configured to:
    transmit the proximity detection request to the ProSe server in the EPC; and
    receive the proximity alert message from the ProSe server in the EPC.

3. The apparatus of claim 1, wherein the proximity detection signal indicates when the proximity detection request is for establishing a P2P connection with the second UE.

4. The apparatus of claim 1, wherein the one or more processors are further configured to encode a discovery message for transmission to the second UE, wherein the discovery message is for establishing a P2P connection with the second UE using assistance information included in the proximity alert message.

5. The apparatus of claim 1, wherein the time period window parameter includes a time of day, a day of a week, a week of a month, or a month of a year for establishing communications with the second UE in the P2P network.

6. The apparatus of claim 1, wherein the proximity detection request includes a location window parameter, wherein the location window parameter is a selected geographic setting.

7. The apparatus of claim 1, wherein the time period window parameter includes a plurality of times of day, days of a week, weeks of a month, or months of a year for proximity detection of other UEs in the P2P network or for establishing P2P communications between the UE and other UEs in the P2P network.

8. The apparatus of claim 1, wherein the one or more processors are further configured to directly communicate with the second UE using a P2P communications connection, wherein the P2P communications connection is a wireless local area network (WLAN) connection.

9. A non-transitory machine readable storage medium having instructions embodied thereon for communicating in a peer to peer (P2P) network, the instructions being executed by one or more processors to perform the following operations:
    encoding, at a first user equipment (UE), a proximity detection request for transmission to a ProSe server in an Evolved Packet Core (EPC), wherein the proximity detection request:
    a time period window parameter;
    identification information of a second UE, and a proximity detection signal indicating when the proximity detection request is for proximity detection of the second UE; and decoding, at the first UE, a proximity alert message received from the ProSe server in accordance with the time period window parameter.

10. The non-transitory machine readable storage medium of claim 9, wherein the proximity detection signal indicates when the proximity detection request is for establishing a P2P connection with the second UE.

11. The non-transitory machine readable storage medium of claim 9, further comprising instructions which when executed by the one or more processors perform the following: encoding a discovery message for transmission to the second UE, wherein the discovery message is for establishing a P2P connection with the second UE using assistance information included in the proximity alert message.

12. The non-transitory machine readable storage medium of claim 9, wherein the time period window parameter includes a time of day, a day of a week, a week of a month, or a month of a year for establishing communications with the second UE in the P2P network.

13. The non-transitory machine readable storage medium of claim 9, wherein the proximity detection request includes a location window parameter, wherein the location window parameter is a selected geographic setting.

14. The non-transitory machine readable storage medium of claim 9, wherein the time period window parameter includes a plurality of times of day, days of a week, weeks of a month, or months of a year for proximity detection of other UEs in the P2P network or for establishing P2P communications between the first UE and other UEs in the P2P network.

15. The non-transitory machine readable storage medium of claim 9, further comprising instructions which when executed by the one or more processors perform the following: directly communicating with the second UE using a P2P communications connection, wherein the P2P communications connection is a wireless local area network (WLAN) connection.

16. An apparatus of a ProSe server operable to communicate in a peer to peer (P2P) network, the apparatus comprising one or more processors configured to:

decode, at the ProSe server, a proximity detection request received from a first user equipment (UE), wherein the proximity detection request includes:
a time period window parameter;
identification information of a second UE, and
a proximity detection signal indicating when the proximity detection request is for proximity detection of the second UE; and encode, at the ProSe server, a proximity alert message for transmission to the first UE in accordance with the time period window parameter.

17. The apparatus of claim 16, wherein the ProSe server operates in an Evolved Packet Core (EPC).

18. The apparatus of claim 16, wherein the proximity detection signal indicates when the proximity detection request is for establishing a P2P connection between the first UE and the second UE.

19. The apparatus of claim 16, wherein the time period window parameter includes a time of day, a day of a week, a week of a month, or a month of a year for establishing communications between the first UE and the second UE in the P2P network.

20. The apparatus of claim 16, wherein the proximity detection request includes a location window parameter, wherein the location window parameter is a selected geographic setting.

21. The apparatus of claim 16, wherein the time period window parameter includes a plurality of times of day, days of a week, weeks of a month, or months of a year for proximity detection of other UEs in the P2P network or for establishing P2P communications between the first UE and other UEs in the P2P network.

* * * * *